(12) United States Patent
Shubin et al.

(10) Patent No.: US 8,014,636 B2
(45) Date of Patent: Sep. 6, 2011

(54) ELECTRICAL CONTACTS ON TOP OF WAVEGUIDE STRUCTURES FOR EFFICIENT OPTICAL MODULATION IN SILICON PHOTONIC DEVICES

(75) Inventors: Ivan Shubin, San Diego, CA (US); Guoliang Li, San Diego, CA (US); John E. Cunningham, San Diego, CA (US); Ashok Krishnamoorthy, San Diego, CA (US); Xuezhe Zheng, San Diego, CA (US)

(73) Assignee: Oracle America, Redwood City, CA (US)

( * ) Notice: Subject to any disclaimer, the term of this patent is extended or adjusted under 35 U.S.C. 154(b) by 378 days.

(21) Appl. No.: 12/389,608

(22) Filed: Feb. 20, 2009

(65) Prior Publication Data
US 2010/0215309 A1  Aug. 26, 2010

(51) Int. Cl.
*G02F 1/035* (2006.01)
*H01L 29/06* (2006.01)
*H04B 10/04* (2006.01)

(52) U.S. Cl. ............ 385/3; 385/2; 385/14; 385/24; 385/28; 385/29; 385/122; 385/131; 385/132; 257/21; 257/E29.005; 977/742; 398/186; 398/188

(58) Field of Classification Search ............... 385/1, 2, 385/3, 14, 15, 24, 30, 40, 129, 130, 131, 385/132, 26, 27, 28, 29, 122, 5, 8; 257/21; 257/E29.005; 977/742; 398/44, 58, 141, 398/186, 188
See application file for complete search history.

(56) References Cited

U.S. PATENT DOCUMENTS

| | | | | |
|---|---|---|---|---|
| 5,245,465 A | * | 9/1993 | Tomita et al. | 359/246 |
| 5,838,870 A | * | 11/1998 | Soref | 385/131 |
| 7,697,793 B2 | * | 4/2010 | Webster et al. | 385/2 |
| 2003/0039447 A1 | * | 2/2003 | Clapp | 385/40 |
| 2007/0223543 A1 | * | 9/2007 | Prosyk et al. | 372/26 |
| 2010/0215309 A1 | * | 8/2010 | Shubin et al. | 385/3 |

* cited by examiner

*Primary Examiner* — Brian M Healy
(74) *Attorney, Agent, or Firm* — Osha · Liang LLP

(57) ABSTRACT

A phase modulation waveguide structure includes one of a semiconductor and a semiconductor-on-insulator substrate, a doped semiconductor layer formed over the one of a semiconductor and a semiconductor-on-insulator substrate, the doped semiconductor portion including a waveguide rib protruding from a surface thereof not in contact with the one of a semiconductor and a semiconductor-on-insulator substrate, and an electrical contact on top of the waveguide rib. The electrical contact is formed of a material with an optical refractive index close to that of a surrounding oxide layer that surrounds the waveguide rib and the electrical contact and lower than the optical refractive index of the doped semiconductor layer. During propagation of an optical mode within the waveguide structure, the electrical contact isolates the optical mode between the doped semiconductor layer and a metal electrode contact on top of the electrical contact.

26 Claims, 13 Drawing Sheets

ELECTRICAL CONTACTS ON TOP OF WAVEGUIDE STRUCTURES FOR EFFICIENT OPTICAL MODULATION IN SILICON PHOTONIC DEVICES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Agreement No. HR0011-08-9-001 awarded by DARPA.

BACKGROUND OF INVENTION

1. Field of the Invention

The invention relates generally to photonic waveguide structures with improved electrical contacts for reducing lossy performance during optical modulation in high-speed optical modulators. More specifically, the invention relates to a photonic waveguide structure, where the provision of a conductive electrical contact isolates a propagating optical mode between the waveguide core and the electrodic contact while maintaining excellent electrical connectivity and low optical loss.

2. Background Art

The tunable non-linear optical properties of Silicon (Si) have been a major factor in the recent emergence of Si as a photonics material. With high performance computing (HPC) entering into the multi-core Central Processing Unit (CPU) era and linear scaling of computing bandwidth with the number of cores, communication bandwidth per core on multichips is becoming a performance bottleneck. Internal chip communication in Si chips using optical waveguides goes a long way in solving the aforementioned bottleneck that is pronounced in chip communication involving metallic interconnects. Thus, using Si as a light guiding element is the key to ultrafast HPC. Along with solving the problem of bandwidth requirement, Si photonics also provides for small circuit delay times, i.e., low latency, and for low power consumption. These, coupled with the relative ease of fabricating Si photonic devices using the typical CMOS processes with high yield and at low cost, enable the exploitation of the aforementioned advantages for realizing ultrafast circuits. It is possible to build a point-to-point communication network among a large number of CPU cores using Si photonic links, and maintain the scaled high performance with affordable manufacturing and energy costs.

In order to convert high-speed electrical data signals into optical form, an optical modulator is required. The basic requirements demanded of the optical modulator are high speed (>10 Gb/s), low power consumption, high ON/OFF extinction ratio, and compactness of size. To date, most of the reported Si high-speed modulators are based on the free-carrier plasma dispersion effect, or, the reduction of the refractive index of Si material with increased free carrier densities, i.e., electrons and holes. To utilize this effect for data modulation, the carrier densities in an optical waveguide have to be modulated in order to modulate the optical refractive index, and, thereby, the optical phase of the propagating laser light. The phase modulation can then be converted into optical intensity modulation (i.e. ON/OFF switching) by building the phase modulation waveguide into a Mach-Zehnder interferometer (MZI) or a ring resonator.

FIG. 1 shows a waveguide phase shifter 100, where the phase modulation waveguide is based on a modified MOS capacitor utilizing poly-Si instead of metal. The waveguide phase shifter 100 includes a thin gate oxide layer 125 (shown with boxed emphasis in FIG. 1) on top of the n-type Si slab 115 of the Si-on-oxide (SOI) substrate formed with an oxide ($SiO_2$) layer 110 over an Si layer 105, and a highly conductive p-doped poly-Si waveguide rib 120 on top of the gate oxide layer 125. The poly-Si waveguide rib 120 forms a modified MOS capacitor embedded in an optical waveguide with the thin gate oxide layer 125 and the Si slab 115. The poly-Si waveguide rib 120 is also surrounded by the oxide layer 125.

Due to the large difference in optical refractive indices between Si/poly-Si and the surrounding oxide layer 125, the optical mode is confined around the thin gate oxide layer 125, with the surrounding oxide layer 125 serving as a cladding. Although provision of electrical contacts on top of the Si optical waveguide is preferred for efficient application of the electric field for high-speed optical modulation, low optical loss, and high extinction ratio, the abovementioned enormous optical absorption coefficient of metal contacts, along with the signal overlap of the propagating optical mode in the waveguide with the top surfaces of the poly-Si rib 120 and the Si slab 115, render the waveguide phase shifter 100 lossy. In order to mitigate this problem, metallic contacts are deployed on top of the poly Si layer at lateral extensions thereof.

FIG. 1 shows the n-contacts 130 and the p-contacts 135 made on the Si-slab 115 and the poly-Si rib 120 respectively. To provide for the aforementioned contacts, the Si-slab 115 and the poly-Si rib 120 have a high surface doping density. The surrounding oxide layer 125, to an extent, prevents the electric fields from spreading to the metallic contacts because of the confinement of the optical mode. By providing a relatively higher permittivity than that of free space, the thin gate oxide layer 125 provides for strong incident radiation polarization dependence of the optical mode.

When a voltage $V_D$ is applied between the p-type poly-Si rib 120 and the n-type Si-slab 115, a thin-charge layer is accumulated at both sides of the gate oxide, thereby modulating the carrier densities. The induced charge density change $\Delta N_e$ (for electrons) and $\Delta N_h$ (for holes) are related to the applied voltage as:

$$\Delta N_e = \Delta N_h = \frac{\varepsilon}{e t_{ot} t_{eff}}(V_D - V_{FB}), \qquad (1)$$

where $\epsilon = \epsilon_0 \epsilon_r$ is the permittivity of the thin oxide layer 125, $\epsilon_o$ being the permittivity of free space and $\epsilon_r$ being the low-frequency dielectric constant of the thin oxide layer 125, e is the electronic charge, $t_{ot}$ is the thickness of the oxide layer, $t_{eff}$ is the effective charge layer thickness, and $V_{FB}$ is the flat band voltage of the MOS structure. The flat band voltage $V_{FB}$ is calculated by taking into account the charge present at the oxide-semiconductor interface and the thin oxide layer 125.

The refractive index changes caused by the accumulation of charge carriers may be obtained from Kramers-Kronig analysis that relates real (refractive index) and imaginary (absorption) parts of the dielectric function of a material. The change in refractive index $\Delta n_{eff}$ is related to the phase shift $\Delta\phi$ in the optical mode as:

$$\Delta\phi = \frac{2\pi}{\lambda}\Delta n_{eff} L, \qquad (2)$$

where $\lambda$ is the wavelength of radiation in free space, $\Delta n_{eff}$ is the effective refractive index change in the waveguide, which is the difference between the effective refractive indices of the waveguide phase shifter 100 before and after accumulation of charges, and L is the active length of the phase shifter.

FIG. 2 shows an asymmetric MZI 200, including two identical capacitive MOS phase shifters 220 along two arms 210 of the MZI 200, for conversion of the phase modulation into an intensity modulation. The arms 210 are also made of Si. The asymmetric MZI 200 provides for an optical path difference between the two arms 210 so that a Y-fork 225 may be exploited to split and combine optical beams thereof. Input coupling is through optical input portion 205, and output coupling is through optical output portion 215.

FIG. 3 shows a ring resonator 300 coupled to a linear waveguide 302 for conversion of the phase modulation into an intensity modulation. When radiation at appropriate wavelengths is coupled to the ring resonator 310 (which includes phase modulation section 312 constructed from waveguide phase shifters) through the optical input portion 305 of the linear waveguide 302, the radiation undergoes intensity modulation over multiple optical paths traveled in the loop, which may be coupled to the optical output portion 315 of the linear waveguide 302.

Although the abovementioned waveguide phase shifter 100 largely avoids optical absorption by metal, the presence of many defects in the material lattice of poly-Si adds to the lossy nature of the structure, aided by a significant overlap of the optical mode with poly-Si. As a exemplary solution, FIG. 4 shows a waveguide phase shifter 400 with the waveguide rib 420 comprising a less conductive p-doped epitaxially grown Si (starting with epi-Si crystal instead of poly-Si). Thin layers of poly-Si 422 are deposited to make metallic p-contacts 435 with the top corners of the epi-Si waveguide rib 420. Like the waveguide phase shifter 100 in FIG. 1, the structure has a thin gate oxide layer 425 (shown with emphasis in FIG. 4) on top of the n-type Si slab 415 of the SOI substrate formed with an oxide layer 410 over an Si layer 405. The metallic n-contacts 430 are made on the Si-slab 415.

Although the improved waveguide phase shifter 400 of FIG. 4 significantly reduces optical loss due to the absorption of poly-Si, the structure may induce large resistance in modulators with sub-micron waveguide widths due to small contact area between the poly-Si layers 422 and the epi-Si waveguide rib 420, the typical width of the epi-Si waveguide rib 420 being 0.5 microns. As small waveguides are preferred for high modulation efficiency, the resistance becomes a performance deterrent factor. Therefore, the waveguide phase shifter 400 of FIG. 4 typically is suited for waveguide widths in excess of 3 microns. Additionally, the efficiency of both the waveguide phase shifters (100, 400) of FIGS. 1 and 4 is compromised due to the presence of lateral electrical contacts instead of contacts on top of the Si optical waveguide.

FIG. 5 shows a phase modulation waveguide 500 employing a lateral PN junction operated in depletion mode. The phase modulation waveguide 500 comprises an SOI substrate formed with an oxide layer 510 over an Si layer 505. The waveguide rib includes a p-doped Si 515 portion and an n-doped Si 520 portion forming a PN junction 540 along a lateral direction parallel to the surface of the oxide layer 510. Electrodes 530 and 535 are provided in contact with highly doped conductive regions of the p-doped Si 515 portion and the n-doped Si 520 portion. External electrical circuitry (not shown in FIG. 5) may be connected to the electrodes 530 and 535 to reverse bias the PN junction 540 such that the width of a carrier depletion zone is changed, thereby resulting in change of carrier densities in the optical mode. This results in a change of the refractive index along the phase modulation waveguide 500, thereby enabling modulation of light waves. The structure does not require electrical contacts on top of the waveguide rib (515, 520) and, therefore, the problem of lossy performance due to metal absorption is avoided.

An emerging type of high-speed modulators employs Ge/SiGe quantum wells epitaxially grown on an Si substrate through Low Pressure Chemical Vapor Deposition (LPCVD). FIG. 6 shows a quantum-well device 600 with an undoped Ge/SiGe quantum well layer 620 sandwiched by doped SiGe layers (a p-doped layer 615 and an n-doped layer 625). The quantum-well device 600 includes an Si substrate 605 over which doped SiGe layers (p-doped layers 610 and 615) are formed. The p-doped layer 610 is highly conductive in order to enable the provision of electrical p-contact 640. The sandwich structure is surrounded by an oxide layer 630, and n-contact 635 is provided on top of the n-doped layer 625. The n-contact 635 extends over the $SiO_2$ layer 630 in a lateral direction thereof. When a voltage is applied across the doped SiGe layers (615, 625), the energy of the bound states inside the quantum well layer 620 reduces due to Coulombic interaction between electron-hole pairs. The effective band gap is modulated and there is a red shift in the interband absorption, leading to a decrease in the peak absorption value. This phenomenon is known as Quantum-Confined Stark Effect (QCSE), which is exploited to change optical absorption in the quantum well 620. Thus, modulation of laser light intensity passing through the quantum well 620 is possible without the need for an MZI or a ring resonator structure. The light may be guided by the oxide/SiGe and the SiGe/Si interfaces.

As efficient modulation requires embedding the Ge/SiGe quantum wells into a waveguide to provide for a long modulation length and small capacitance, there is a necessity to make electrical contact on top of the doped SiGe layers (610, 625). Typically, Au/Ti contacts are employed to make electrical contacts on top of the doped SiGe layers (610, 625). Again, this causes the structure to be lossy as there is significant overlap of the optical mode 650 with the metal.

Indium Tin Oxide (Tin-doped Indium Oxide, or, simply ITO) is a mixture of Indium Oxide ($In_2O_3$) and Tin Oxide ($SnO_2$), typically 90% $In_2O_3$ and 10% $SnO_2$ by weight. The high electrical conductivity and optical transparency of ITO aid utility in the field of optoelectronic devices. The transparency of ITO starts around an optical wavelength of 450 nm and may be extended into the near infrared region covering the wavelengths employed in optical interconnects. Depending on the ITO deposition techniques and composition, the electrical resistivity of ITO may measure in the 10-4 ohm-cm range.

ITO belongs to the family of transparent conductive oxides (TCOs), of which the most noted are Zinc Oxide doped with Al or Ga, and Titanium Oxide doped with Nb. Even though TCOs and other such materials are currently being investigated, ITO's superior properties have rendered it ahead of the pack. A variety of application and substrate dependent ITO thin film deposition techniques are available. However, a compromise between conductivity and transparency has to be reached during film deposition, as a high concentration of charge carriers will increase the conductivity of the material but decrease the transparency of the material. ITO thin films have been deposited by ion beam deposition, pulsed laser deposition, Chemical Vapor Deposition (CVD), and a variety of sputtering techniques such as Radio Frequency (RF) and Direct Current (DC) sputtering, co-sputtering, and reactive sputtering with oxygen and carbon dioxide additives to argon.

Due to the above-mentioned low optical absorption, coupled with high electrical conductivity, ITO has widely found use in optoelectronic devices such as transparent electrodes for liquid crystal displays (LCDs). LCD glass has transparent ITO coated electrical conductors used as electrodes plated onto each side thereof in contact with the liquid crystal fluid. The light propagates through liquid crystal cells with corresponding image information encoded thereof, and emerges out through an ITO coated screen. Typical transmission varies from 80% to 95%. in the normal incidence configuration. Several other applications utilizing ITO are possible, including solar cells, vertical cavity surface emitting lasers, and light emitting diodes (LEDs). Here, the optical propagation is also arranged surface normal to the ITO coated electrode mirror.

In addition to ITO, novel materials such as metamaterials comprising arrays of carbon nanotubes (CNTs) are being researched and being touted as building blocks of electronics and optoelectronics in a variety of applications. The aforementioned CNTs may be single-walled or multi-walled. CNT thin films possess unique electronic and optical properties that allow for utility in applications where transparency and conductivity are of prime importance. A transmission of 85% has been reported in CNT films, thereby lending credence to the competitiveness of CNTs with ITO. CNT films, having already found place in LEDs, displays and photovoltaics, also have shown promise as transparent microwave or EMI shielding coatings. With tunable dielectric properties, CNTs and engineered CNT metamaterials may displace ITO in the current applications to pave the way for the advent of novel components and systems once mature manufacturing processes are devised.

SUMMARY OF INVENTION

In general, in one aspect, embodiments of the invention relate to a phase modulation waveguide structure that includes one of a semiconductor and a semiconductor-on-insulator substrate, a doped semiconductor layer formed over the one of a semiconductor and a semiconductor-on-insulator substrate, said doped semiconductor layer including a waveguide rib protruding from a surface thereof not in contact with the one of a semiconductor and a semiconductor-on-insulator substrate, and an electrical contact on top of the waveguide rib. The electrical contact is formed of a material with an optical refractive index close to that of a surrounding oxide layer that surrounds the waveguide rib and the electrical contact and lower than the optical refractive index of the doped semiconductor layer. During propagation of an optical mode within the waveguide structure, the electrical contact isolates the optical mode between the doped semiconductor layer and a metal electrode contact on top of said electrical contact.

In general, in one aspect, embodiments of the invention relate to a quantum well device that includes a first doped semiconductor alloy layer grown on a semiconductor substrate, a quantum well structure including an undoped semiconductor alloy quantum well layer sandwiched between a second doped semiconductor alloy layer of a same material and a doping as the first doped semiconductor alloy layer and a third doped semiconductor alloy layer of the same material and opposite doping as the first doped semiconductor alloy layer, the second doped semiconductor alloy layer contacting the first doped semiconductor alloy layer and being on top of the first doped semiconductor alloy layer, and an electrical contact on top of the quantum well structure. The electrical contact is formed of a material with an optical refractive index close to that of a surrounding oxide layer that surrounds the quantum well structure and the electrical contact and lower than the optical refractive index of the doped semiconductor alloy layers. When a voltage is applied across the second doped semiconductor alloy layer and the third doped semiconductor alloy layer, an electric field and an optical absorption inside the undoped semiconductor alloy quantum well layer are changed, thereby modulating field intensity passing through said undoped semiconductor alloy quantum well layer.

In general, in one aspect, embodiments of the invention relate to a method of improving electrical connectivity and minimizing optical loss in a photonic waveguide structure. The method includes providing an electrical contact on top of a semiconductor photonic waveguide, said electrical contact being formed of a material with an optical refractive index close to that of a surrounding oxide layer that surrounds the semiconductor waveguide and the electrical contact and lower than the optical refractive index of constituent semiconductor layers. The electrical contact minimizes optical loss by isolating a propagating optical mode between a core of the semiconductor waveguide and a metal electrode contacting said electrical contact.

In general, in one aspect, embodiments of the invention relate to a communication link between processor cores includes a high-speed modulator. The high-speed modulator includes that includes a phase modulation waveguide structure that, in turn, includes one of a semiconductor and a semiconductor-on-insulator substrate, a doped semiconductor layer formed over the one of a semiconductor and a semiconductor-on-insulator substrate, said doped semiconductor layer including a waveguide rib protruding from a surface thereof not in contact with the one of a semiconductor and a semiconductor-on-insulator substrate, and an electrical contact on top of the waveguide rib. The electrical contact is formed of a material with an optical refractive index close to that of a surrounding oxide layer that surrounds the waveguide rib and the electrical contact and lower than the optical refractive index of the doped semiconductor layer. During propagation of an optical mode within the waveguide structure, the electrical contact isolates the optical mode between the doped semiconductor layer and a metal electrode contact on top of said electrical contact.

In general, in one aspect, embodiments of the invention relate to a communication link between processor cores includes a high-speed modulator. The high-speed modulator includes that includes a quantum well device that, in turn, includes a first doped semiconductor alloy layer grown on a semiconductor substrate, a quantum well structure including an undoped semiconductor alloy quantum well layer sandwiched between a second doped semiconductor alloy layer of a same material and a doping as the first doped semiconductor alloy layer and a third doped semiconductor alloy layer of the same material and opposite doping as the first doped semiconductor alloy layer, the second doped semiconductor alloy layer contacting the first doped semiconductor alloy layer and being on top of the first doped semiconductor alloy layer, and an electrical contact on top of the quantum well structure. The electrical contact is formed of a material with an optical refractive index close to that of a surrounding oxide layer that surrounds the quantum well structure and the electrical contact and lower than the optical refractive index of the doped semiconductor alloy layers. When a voltage is applied across the second doped semiconductor alloy layer and the third doped semiconductor alloy layer, an electric field and an optical absorption inside the undoped semiconductor alloy quantum well layer are changed, thereby modulating field intensity passing through said undoped semiconductor alloy quantum well layer.

Other aspects and advantages of the invention will be apparent from the following description and the appended claims.

DETAILED DESCRIPTION

Figure 1:
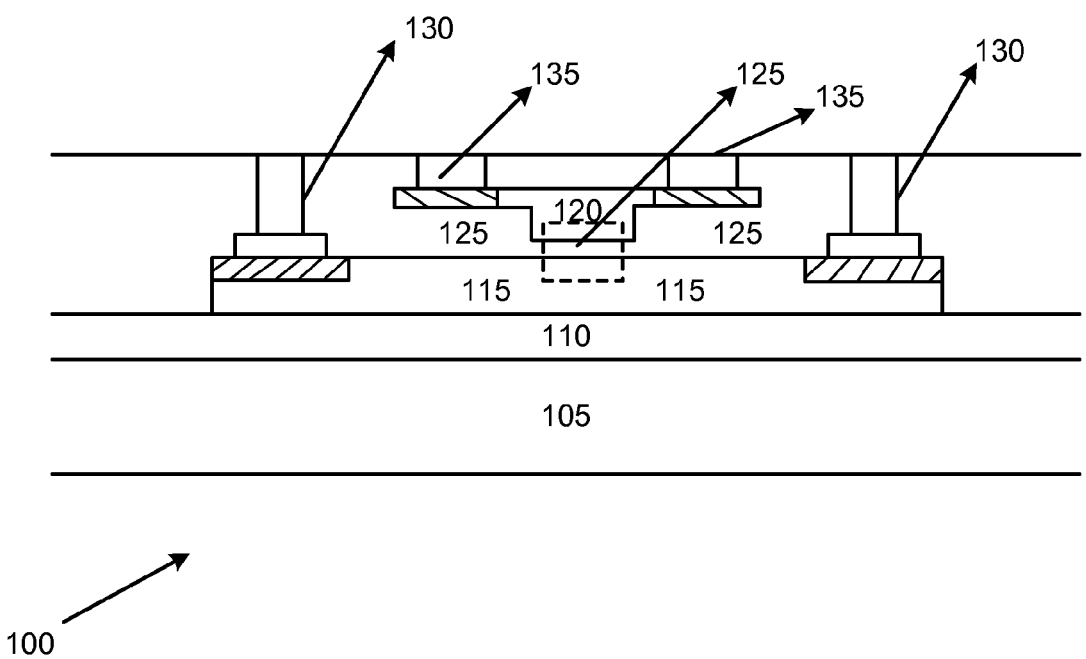
FIG. 1 shows a phase modulation waveguide structure using a poly-Si waveguide rib with lateral electrical contacts.
Figure 2:
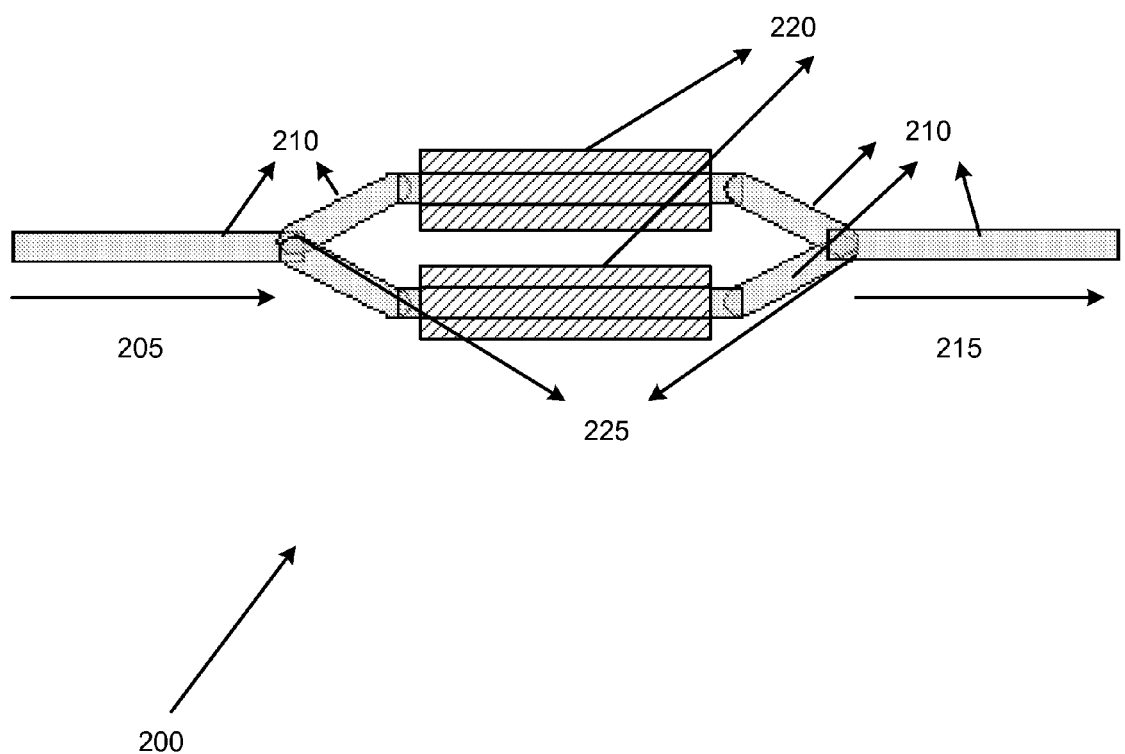
FIG. 2 shows a MZI utilizing phase modulation waveguide structures for optical modulation.
Figure 3:
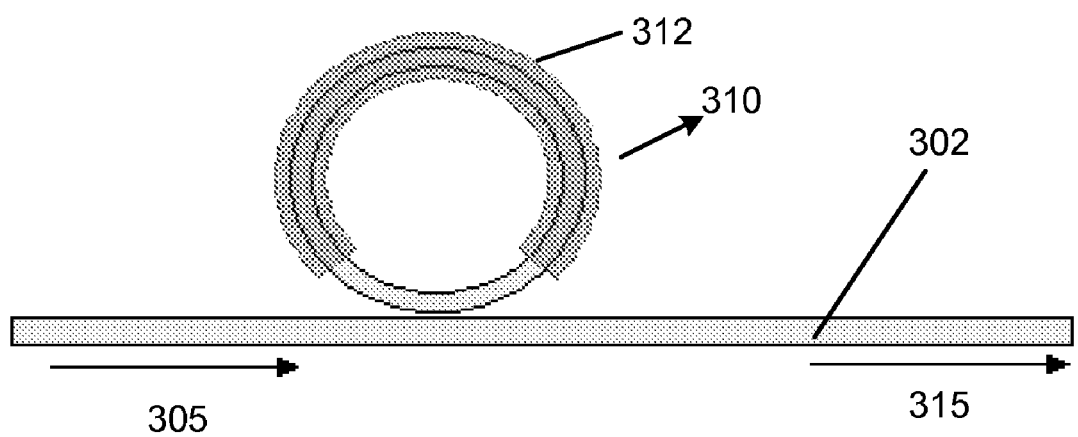
FIG. 3 shows a ring resonator utilizing a phase modulation waveguide structure for optical modulation.
Figure 4:
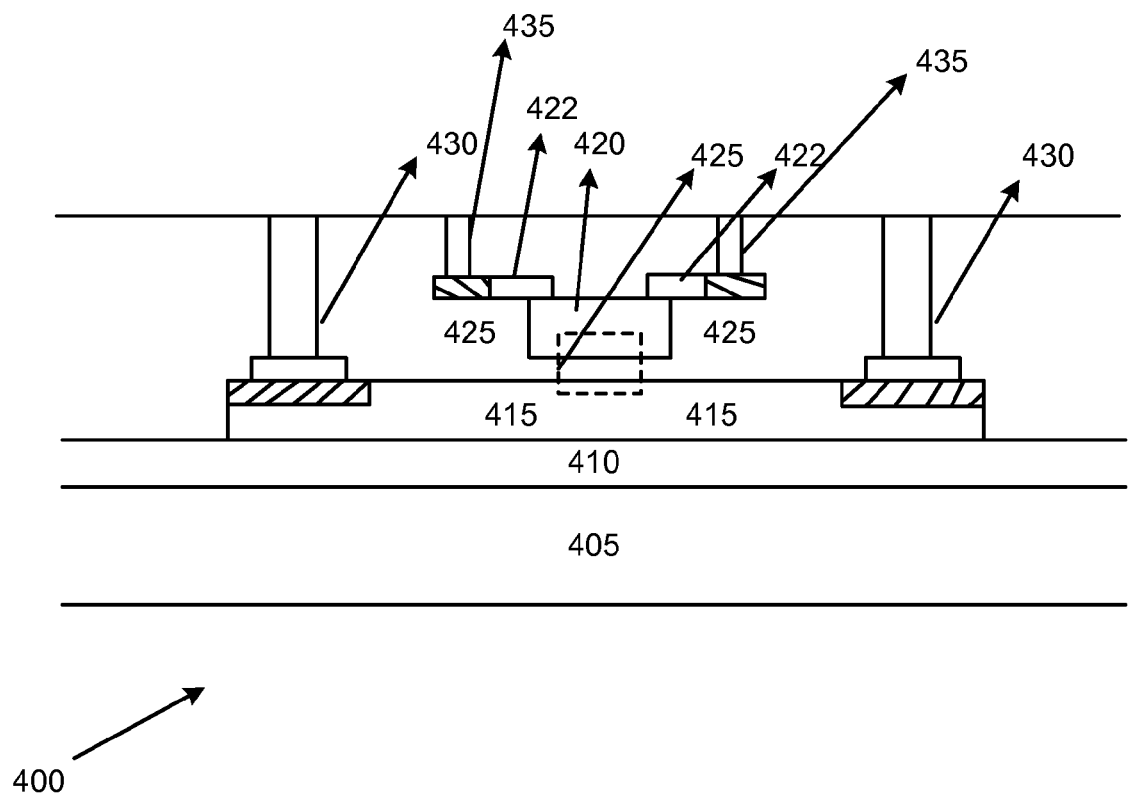
FIG. 4 shows a phase modulation waveguide structure using an epi-Si waveguide rib in conjunction with poly-Si contacts.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the present invention describe a photonic waveguide structure with an improved conductive electrical contact on top of the waveguide for reduced optical loss in high-speed optical modulators. In one or more embodiments, such an electrical contact may isolate the propagating mode between the waveguide core and the metal electrodic contacts while maintaining excellent electrical connectivity and low optical loss.

Figure 7:
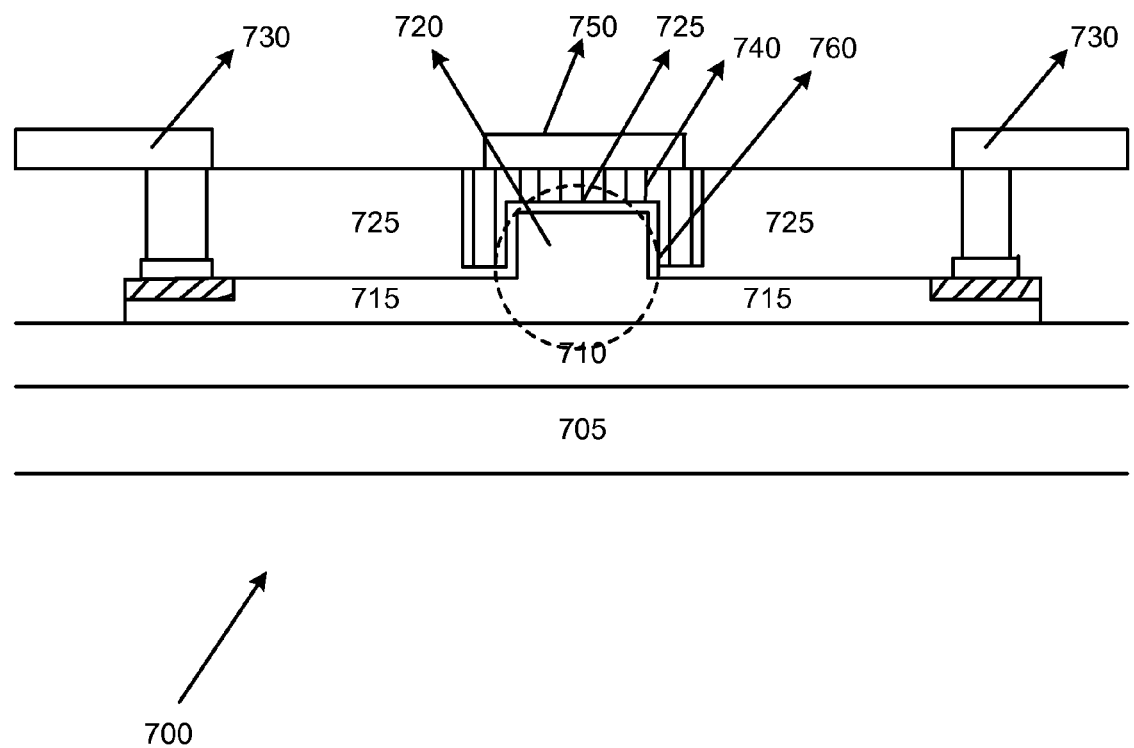
FIG. 7 shows a phase modulation waveguide structure based on a three-dimensional (3-D) MOS capacitor structure in accordance with one or more embodiments of the invention, including a thin gate oxide layer between a conductive contact and a waveguide rib.

FIG. 7 shows a phase modulation waveguide 700 based on a 3-D MOS capacitor structure, with a highly conductive ITO material layer 740 covering the thin gate oxide layer 725 surrounding the doped Si layer 715, in accordance with one or more embodiments of the invention. In one or more embodiments, the phase modulation waveguide 700 includes an SOI substrate formed with an oxide layer 710 over an Si layer 705, over which the doped Si layer 715 is formed. In one or more embodiments, the thin gate oxide layer 725 may not only be on top of the waveguide rib 720 of the doped Si layer 715 but also on sidewalls and shoulder regions thereof, as shown in FIG. 7. In one or more embodiments, this lends convenience to the covering of the 3-D gate oxide layer 725 by the highly conductive ITO material layer 740 using Chemical Vapor Deposition (CVD) or sputtering techniques. In one or more embodiments, the oxide layer 725 may also surround lateral regions of the ITO material layer 740. As ITO has a relatively small optical refractive index (~1.52) of ITO that is close to the refractive index of $SiO_2$ (1.45), ITO and $SiO_2$ form a medium with an approximately uniform refractive index. In one or more embodiments, when ITO is deposited on top of the Si waveguide rib 720 for electrical contact, the propagating optical mode is tightly confined around the Si waveguide rib 720 due to the large refractive index difference between ITO/$SiO_2$ and Si, whose refractive index ~3.5. In one or more embodiments, in order to further increase the optical overlap with the charge layers, a small Si waveguide rib 720 may be used in order that that the optical mode is expanded outside of the Si waveguide rib 720. FIG. 7 also shows the electrodes 730 and 750 provided in contact with conductive regions of the doped Si layer 715 and the ITO material layer 740 respectively, and the optical mode 760 confinement. One or more embodiments of the phase modulation waveguide 700 may provide for low optical loss and low device resistance.

Figure 8:
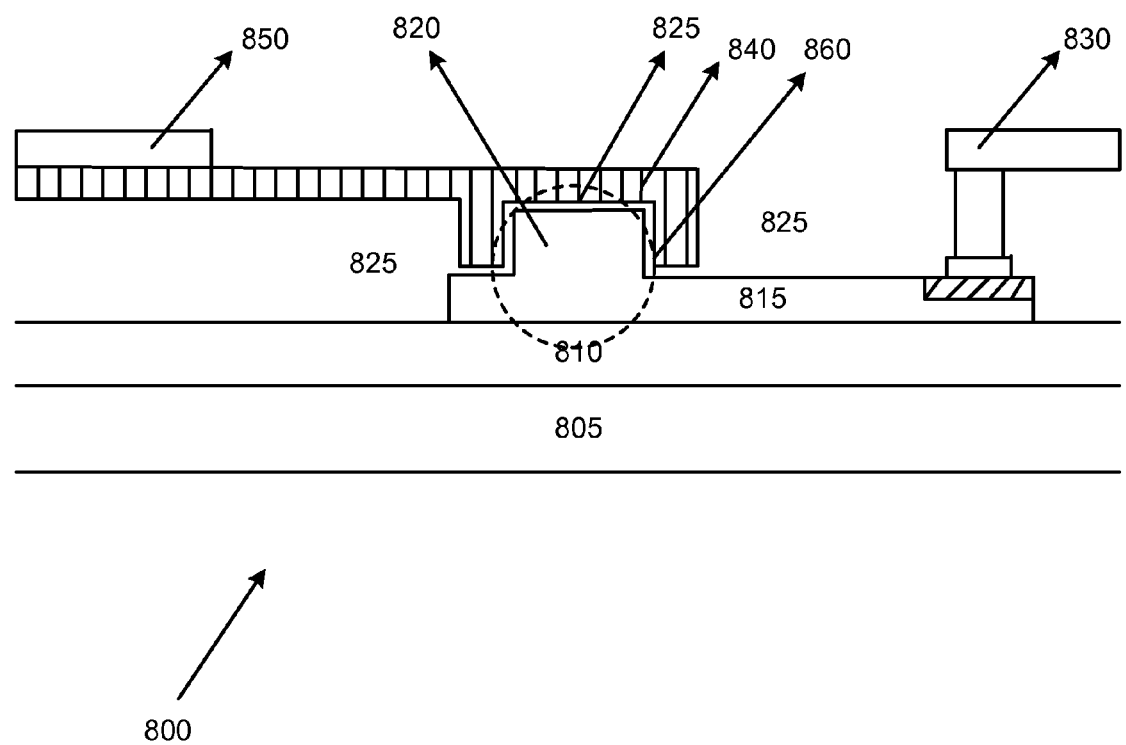
FIG. 8 shows a phase modulation waveguide structure based on a 3-D MOS capacitor structure in accordance with one or more embodiments of the invention, where the conductive contact on top of the thin gate oxide layer is extended in a lateral direction thereof.

FIG. 8 shows a phase modulation waveguide 800 in accordance with one or more embodiments of the invention, where a lateral portion of the highly conductive ITO material layer 840 covering the thin gate oxide layer 825 is extended in a direction parallel to the surface of the thin gate oxide layer 825. In one or more embodiments, the phase modulation waveguide 800, again, includes an SOI substrate formed with an oxide layer 810 over an Si layer 805, over which a doped Si layer 815 is formed. In one or more embodiments, the thin gate oxide layer 825 may cover not only the top of the waveguide rib 820 of the doped Si layer 815 but also the sidewalls and shoulder regions thereof. In one or more embodiments, the oxide layer 825 may also surround lateral regions of the ITO material layer 840. In FIG. 8, as the electrode 850, i.e., anode 850, is located such that there is minimal interference with the optical mode 860, the ITO material layer 840 may be of a smaller thickness, and the doped Si layer 815 need not extend in the lateral direction of the anode 850. Accordingly, one cathode 830 would suffice. In one or more embodiments, a thinner ITO layer 840 and lateral anodic ITO contact may require multiple ITO deposition steps and may offer a device resistance penalty. It is obvious to one skilled in the art that modifications in the structural layouts of the phase modulation waveguides (700, 800) by way of conductive layer (ITO) design, modifications in thickness and lateral extensions of constituent layers, and fabrication steps involved in realizing the aforementioned modifications are well within the scope of the invention, and as such structural layouts are not limited to the descriptions in FIGS. 7-8.

Figure 9:
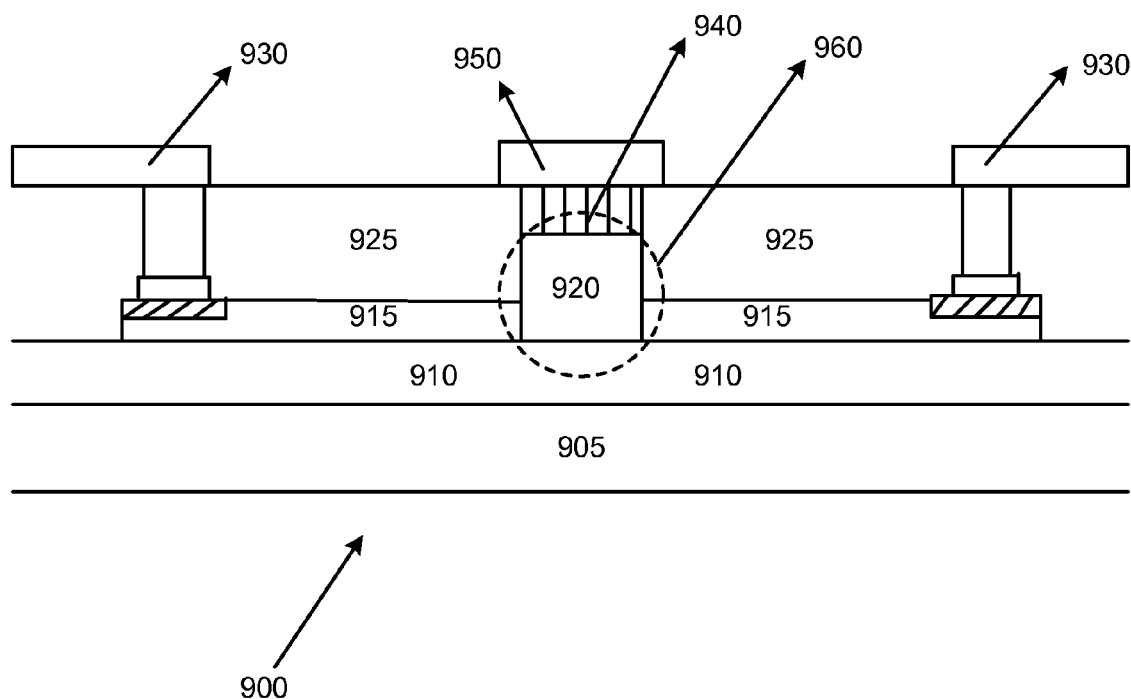
FIG. 9 shows a phase modulation waveguide structure using dual asymmetric lateral PN junctions in accordance with one or more embodiments of the invention, with a conductive contact on top of the p-doped Si rib.

FIG. 9 shows a phase modulation waveguide 900 using dual asymmetric lateral PN junctions in accordance with one or more embodiments of the invention. In one or more embodiments, the phase modulation waveguide 900 includes an SOI substrate formed with an oxide layer 910 over an Si layer 905, over which a p-doped Si rib 920 is formed with two n-doped Si slabs 915 on lateral directions thereof forming PN junctions with the Si rib 920 sidewalls. In one or more embodiments, the Si rib 920 may be n-doped and the two lateral Si slabs 915 may be p-doped. In one or more embodiments, the doping concentration of the Si rib 920 may be less than the doping concentration of the Si slabs 915 to allow for higher depletion within the Si rib 920. As shown in FIG. 9, the p-doped Si rib 920 is electrically contacted with an ITO material layer 940 on top. In one or more embodiments, an oxide layer 925 may surround lateral regions of the ITO material layer 940. In one or more embodiments, when a reverse-bias voltage is applied through anodes 930 provided in contact with highly doped conductive regions of the n-doped Si slabs 915 and the cathode 950 in contact with the ITO material layer 940, the p-doped Si rib 920 will be depleted from both sidewalls toward a center thereof, while the n-doped Si slab 915 regions will not deplete much due to the higher doping concentration. In one or more embodiments, as the p-doped Si rib 915 includes most of the optical mode 960, modulation of the optical mode 960 in the waveguide 900 is ensured.

Figure 5:
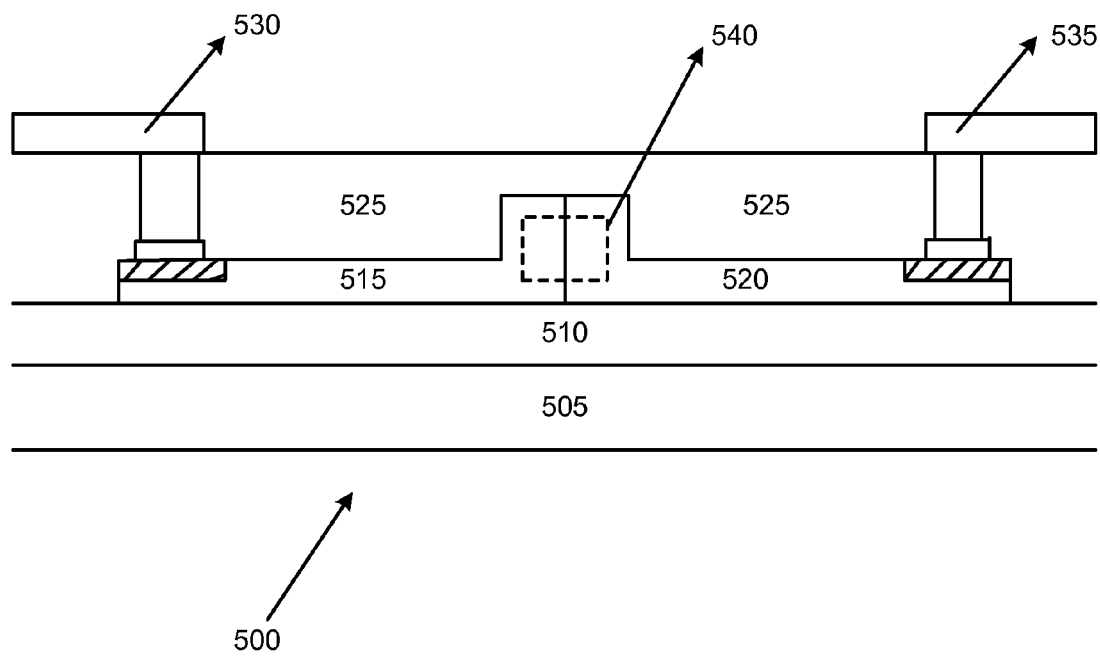
FIG. 5 shows a phase modulation waveguide structure using a reverse-biased lateral PN junction.

As a prime distinguishing feature, the phase modulation waveguide 900 shown in FIG. 9 includes two PN junctions, in contrast to the phase modulation waveguide 500 shown in FIG. 5 that includes a single PN junction 540. In one or more embodiments, the presence of two PN junctions may double the modulation. In one or more embodiments, the PN junctions may deplete even at a reverse bias voltage of 0 volts, with a depletion width of ~60% of the corresponding depletion width at a reverse bias voltage of 2 volts. In the phase modulation waveguide 500 of FIG. 5 with a single PN junction 540, the depletion region at a reverse bias voltage of 0 volts is at the center of the optical mode, which may cause a large portion of the optical mode to be unmodulated when the reverse bias voltage is switched between 0 volts and 2 volts. In the phase modulation waveguide 900 of FIG. 9, the depletion regions at 0 volts may be at the sidewalls of the Si rib 920, which have a lower optical overlap than the center of the optical mode 960. In one or more embodiments, this may reduce the unmodulated portion in the optical mode 960, thereby enhancing the modulation efficiency.

As P and N regions of the lateral PN junctions have to be formed by ion implantation, ions may strike in an unpredictable manner, leading to lattice interactions that may normally cause lateral ion straggle. In one or more embodiments, p-dopants may disperse into the n-region and vice versa, leading to the boundary between the P and N regions not being abrupt. A non-abrupt PN junction has lower modulation efficiency compared to an ideal abrupt PN junction due to the depletion width thereof at 0 volts being wider, leading to a large portion of the optical mode being unmodulated, and due to the modulated region having a lower doping concentration than the target P (or N) region. In one or more embodiments, the target doping concentration may be increased to compensate for the aforementioned effects, but may result in increased optical loss in the phase modulation waveguide 900 due to free-carrier absorption.

Figure 10:
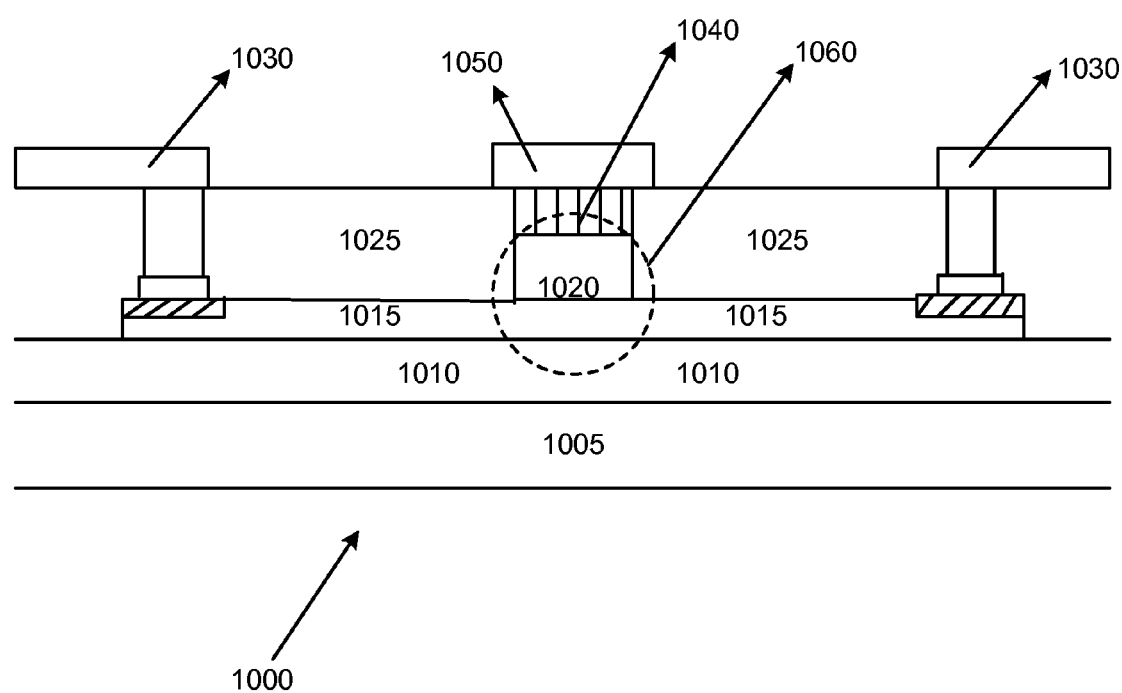
FIG. 10 shows a phase modulation waveguide structure based on a vertical PN junction in accordance with one or more embodiments of the invention, with a conductive contact on top of the p-doped Si rib.

FIG. 10 shows a phase modulation waveguide 1000 using a vertical PN junction in accordance with one or more embodiments of the invention that solves the abovementioned problems associated with horizontal PN junctions. In one or more embodiments, the phase modulation waveguide 1000, again, includes an SOI substrate formed with an oxide layer 1010 over an Si layer 1005, over which an n-doped Si slab 1015 forms a PN junction with a p-doped Si rib 1020 formed on top of the n-doped Si slab 1015. In one or more embodiments, the Si rib 1020 may be n-doped and the Si slab 1015 may be p-doped. As shown in FIG. 10, the p-doped Si rib 1020 is electrically contacted with an ITO material layer 1040 on top, i.e., right on top of the Si waveguide. In one or more embodiments, the ITO material layer 1040 may be used to isolate the optical mode 1060 from the metal electrode, i.e., cathode 1050, thereby avoiding large optical loss while maintaining low resistance and compactness of optical mode 1060. In one or more embodiments, an oxide layer 1025 may surround lateral regions of the ITO material layer 1040. In one or more embodiments, the Si slab 1015 may first be uniformly doped with one dopant by ion implantation, followed by another Si layer with opposite doping being epitaxially grown on top of the Si slab 1015, forming a vertical PN junction. The dopant inside the epitaxially grown Si does not disperse too much into the Si slab 1015, and the dopant in the Si slab 1015 does not disperse into the grown Si.

Figure 11:
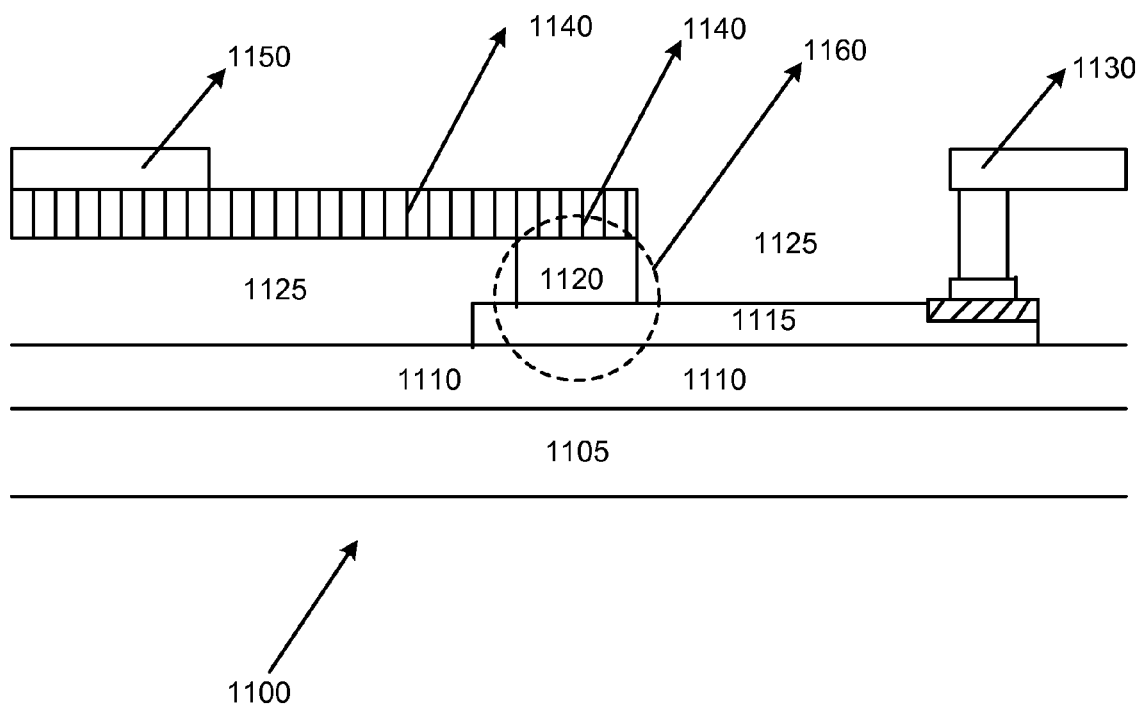
FIG. 11 shows a phase modulation waveguide structure based on a vertical PN junction in accordance with one or more embodiments of the invention, where the conductive contact on top of the p-doped Si rib is extended in a lateral direction thereof.

FIG. 11 shows a phase modulation waveguide 1100 in accordance with one or more embodiments of the invention, where a lateral portion of the highly conductive ITO material layer 1140 on top of the p-doped Si rib 1120 is extended in a direction parallel to the surface of the SOI substrate formed with an oxide layer 1110 over an Si layer 1105. Over the SOI substrate is formed the n-doped Si slab 1115. In one or more embodiments, a gate oxide layer 1125 may surround lateral regions of the ITO material layer 1140, the p-doped Si rib 1120, and the n-doped Si slab 1115. In FIG. 11, as the electrode 1150, i.e., cathode 850, is located such that there is minimal interference with the optical mode 1160, the ITO material layer 1140 may be of a smaller thickness, and the doped Si layer 1115 need not extend in the lateral direction of the cathode 1150. Accordingly, one anode 1130 would suffice. In one or more embodiments, a thinner ITO layer 1140 and lateral cathodic ITO contact may require multiple ITO deposition steps and may offer a device resistance penalty. It is obvious to one skilled in the art that modifications in the structural layouts of the phase modulation waveguides (1000, 1100) by way of conductive layer (ITO) design, modifications in thickness and lateral extensions of constituent layers, and fabrication steps involved in realizing the aforementioned modifications are well within the scope of the invention, and as such structural layouts are not limited to the descriptions in FIGS. 10-11.

Figure 6:
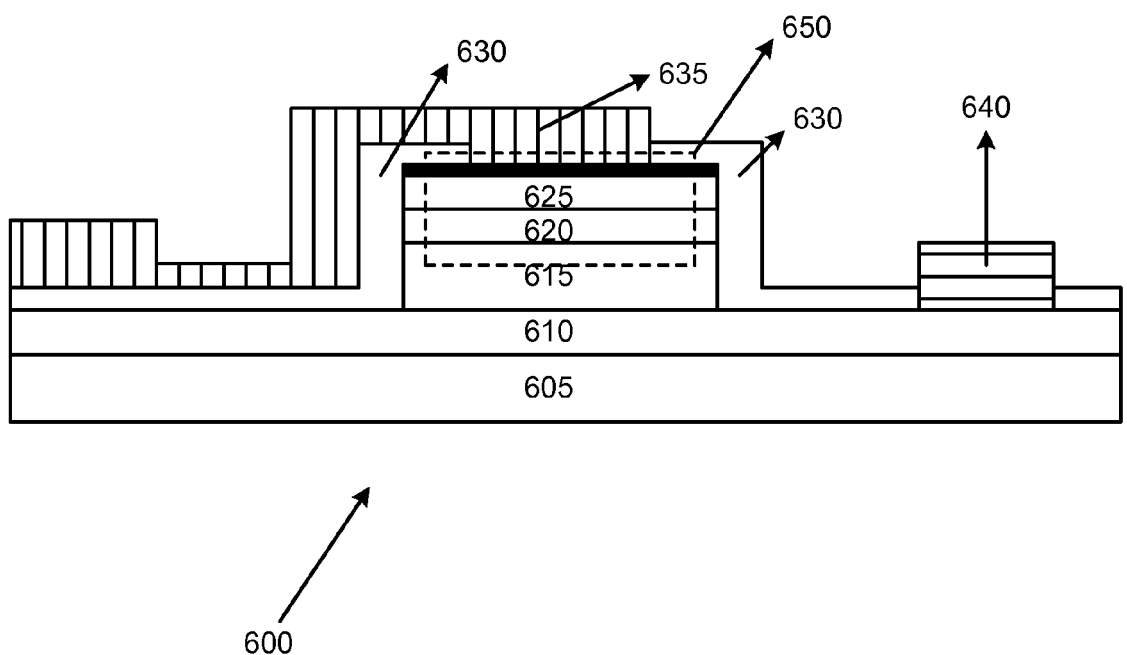
FIG. 6 shows a quantum well device for optical intensity modulation.
Figure 12:
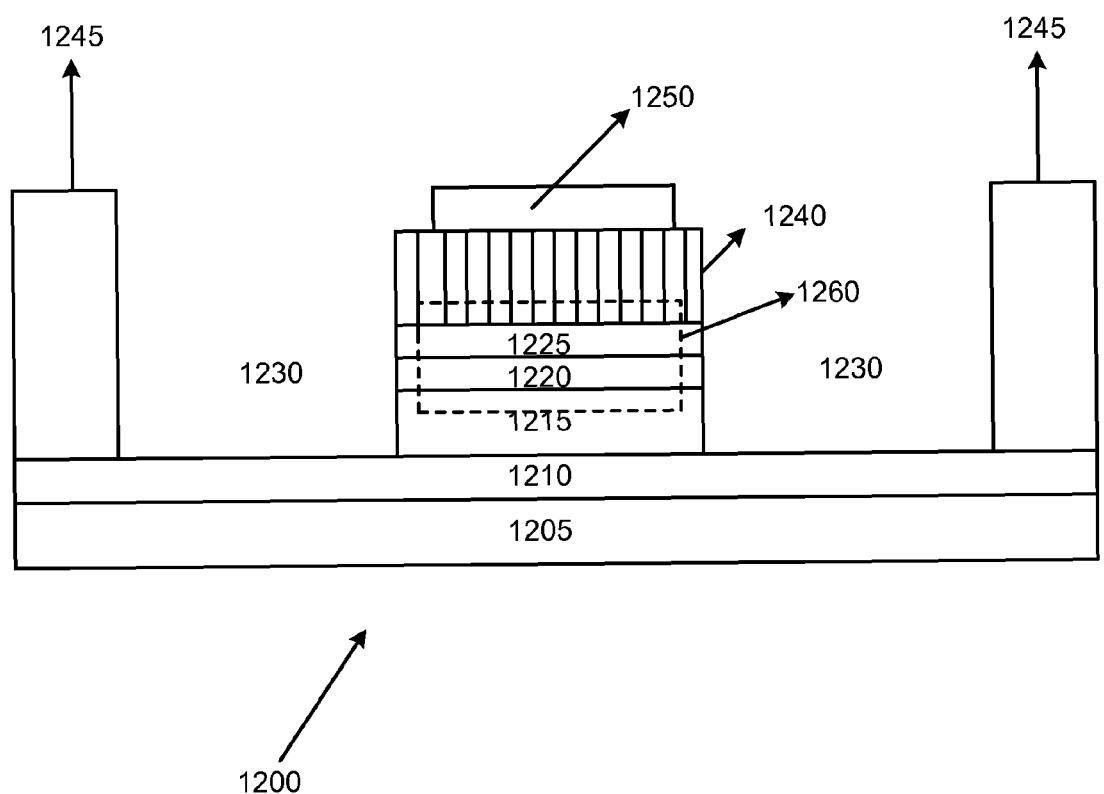
FIG. 12 shows a quantum well device for optical intensity modulation in accordance with one or more embodiments of the invention, with a conductive contact on top of the quantum well structure.

Si modulators based on epitaxially grown Ge/SiGe quantum wells hold a lot of promise for their compact size, wavelength insensitivity, and strong voltage dependent absorption. As discussed above with regard to FIG. 6, the metal contact 635 on top of the waveguide may cause large optical loss due to the significant overlap between the optical mode 650 with the metal electrode 635. FIG. 12 shows a quantum well device 1200 in accordance with one or more embodiments of the invention, where an ITO material layer 1240 is used as the electrical contact material. In one or more embodiments, the quantum well device 1200 includes an undoped Ge/SiGe quantum well layer 1220 sandwiched by doped SiGe layers (a p-doped layer 1215 and an n-doped layer 1225). As shown in FIG. 6, the p-doped layers 1210 and 1215 in FIG. 12 are formed over an Si substrate 1205. In one or more embodiments, the p-doped layer 1210 is highly conductive in order to enable the provision of electrical p-contacts 1245. In one or more embodiments, the sandwich structure and the ITO material layer 1240 may be surrounded by an oxide layer 1230, and n-contact 1250 may be provided on top of the ITO material layer 1240. In one or more embodiments, the overlap of the optical mode 1260 with ITO may not be very lossy due to the low optical absorption of the ITO material layer 1240.

Figure 13:
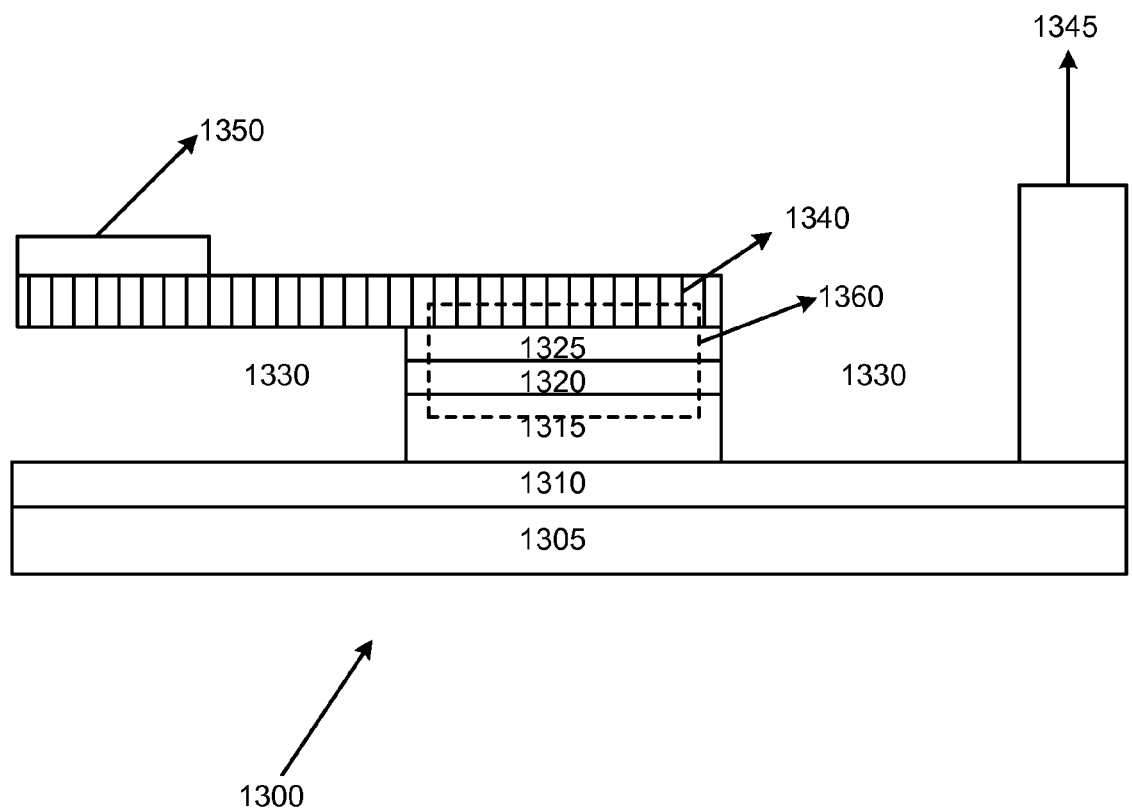
FIG. 13 shows a quantum well device for optical intensity modulation in accordance with one or more embodiments of the invention, where the conductive contact on top of the quantum well structure is extended in a lateral direction thereof.

FIG. 13 shows a quantum well device 1300, where the ITO material layer 1340 contacting the waveguide is extended in a lateral direction thereof perpendicular to the surface of the p-doped layers 1310 and 1315, the p-doped layer 1310 being formed over an Si substrate 1305. In one or more embodiments, the sandwich structure of the undoped Ge/SiGe quantum well layer 1220 bookended by a p-doped SiGe layer 1315 and an n-doped SiGe layer 1325 may be surrounded by an oxide layer 1330. In FIG. 13, as the n-electrode 1350 is located such that there is minimal interference with the optical mode 1360, the ITO material layer 1340 may be of a smaller thickness, and the doped Si layer 1315 need not extend in the lateral direction of the n-electrode 1350. Accordingly, one p-electrode 1345 would suffice. In one or more embodiments, a thinner ITO layer 1340 and lateral electrodic ITO contact may require multiple ITO deposition steps and may offer a device resistance penalty. It is obvious to one skilled in the art that modifications in the structural layouts of the quantum well devices (1200, 1300) by way of conductive layer (ITO) design, modifications in thickness and lateral extensions of constituent layers, and fabrication steps involved in realizing the aforementioned modifications are well within the scope of the invention, and as such structural layouts are not limited to the descriptions in FIGS. 12-13.

Those skilled in the art will appreciate that structural, material (semiconductor, oxide, semiconductor doping), and dimensional modifications in any of the structures described in FIGS. 7-13 utilizing the transparency and conductivity of ITO material to achieve high-speed phase modulation are well within the scope of the invention. In addition, materials with conducive properties such as CNTs or CNT metamaterials may substitute ITO for providing high conductivity and optical transparency, and utilizing like materials for the provision of the aforementioned properties for making electrical contacts on top of the waveguides described above is also within the scope of the invention. In one or more embodiments, CNT layers may be grown on the semiconductor layers by CVD or plasma-enhanced CVD. In one or more embodiments, modifications to ITO and like material compounds for improved electrical contact, lower optical loss or lower refractive index in order to optimize for application in Si photonic waveguide devices described above are also well within the scope of the invention.

Advantages of embodiments of the invention may include one or more of the following. In one or more embodiments, the index of refraction of conductive contact materials such as ITO and CNTs may be smaller than that of Si at wavelengths of interest (1.3-1.5 microns) and, therefore, although the aforementioned materials may be transparent to the evanescent optical field, the materials repel the optical field propagating through the Si waveguide, thereby confining the optical field within the Si waveguide of higher index, while simultaneously conducting the appropriate voltage to said waveguide without absorbing the light. In one or more embodiments described above, the device resistance would be dominated by the doped semiconductor resistance and the contact resistance, thereby rendering the conductive contact material (ITO for example) bulk resistivity a secondary effect. Therefore, the conductivity of the aforementioned material may be reduced without significant increase in the device resistance, thereby further reducing the optical absorption coefficient of the conductive contact material. In one or more embodiments employing ITO as the contact material, the aforementioned tradeoff may easily be implemented by reducing the percentage of $SnO_2$ compound in the ITO material, and the final ITO material compounds may be optimized according to device performance specifications.

While the invention has been described with respect to exemplary embodiments of a photonic waveguide structure with an improved conductive electrical contact on top of the waveguide for reduced optical loss in optical modulation, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A phase modulation waveguide structure comprising:
   one of a semiconductor and a semiconductor-on-insulator substrate;
   a doped semiconductor layer formed over the one of a semiconductor and a semiconductor-on-insulator substrate, said doped semiconductor layer comprising a waveguide rib protruding from a surface thereof not in contact with the one of a semiconductor and a semiconductor-on-insulator substrate; and
   an electrical contact on top of the waveguide rib, said electrical contact being formed of a material with an optical refractive index close to that of a surrounding oxide layer that surrounds the waveguide rib and the electrical contact and lower than the optical refractive index of the doped semiconductor layer,
   wherein during propagation of an optical mode within the waveguide structure, the electrical contact isolates the optical mode between the doped semiconductor layer and a metal electrode contact on top of said electrical contact.

2. The phase modulation waveguide structure according to claim 1, wherein the electrical contact comprises at least one selected from the group of: an Indium Tin Oxide (ITO) material, a CNT material, and metamaterials including arrays of CNTs.

3. The phase modulation waveguide structure according to claim 1, wherein the doped semiconductor layer is a doped Silicon (Si) layer.

4. The phase modulation waveguide structure according to claim 1,
   wherein the phase modulation waveguide structure further comprises a thin gate oxide layer between the waveguide rib and the electrical contact, the thin gate oxide layer being in contact with both the waveguide rib and the electrical contact, and
   wherein the thin gate oxide layer not only is on top of the waveguide rib but also on sidewalls and shoulder regions thereof.

5. The phase modulation waveguide structure according to claim 4, wherein the electrical contact is formed over the thin gate oxide layer by at least one of: a Chemical Vapor Deposition (CVD) and a sputtering process.

6. The phase modulation waveguide structure according to claim 1, wherein the phase modulation waveguide structure further comprises another metal electrode contact on a highly doped region of the doped semiconductor layer, said metal electrode contact being of an opposite polarity of the metal electrode contact on top of the electrical contact.

7. The phase modulation waveguide structure according to claim 1, wherein the electrical contact on top of the waveguide rib is extended in a lateral direction thereof away from the position of the waveguide rib, and the metal electrode contact is on top of the lateral extension of the electrical contact.

8. The phase modulation waveguide structure according to claim 1,
wherein the waveguide rib is doped such that predominant charge carriers in the waveguide rib are complementary to predominant charge carriers in lateral portions of the doped semiconductor layer,
wherein the waveguide rib forms two PN junctions with lateral portions of the doped semiconductor layer, the PN junctions being formed by sidewalls of the waveguide rib in contact with a sidewall each of said lateral portions of the doped semiconductor layer, and
wherein the electrical contact on top of the waveguide rib directly contacts the waveguide rib.

9. The phase modulation waveguide structure according to claim 8, wherein the phase modulation waveguide structure further comprises another metal electrode contact on a highly doped region of a lateral portion of the doped semiconductor layer, said metal electrode contact being of an opposite polarity of the metal electrode contact on top of the electrical contact.

10. The phase modulation waveguide structure according to claim 1,
wherein the waveguide rib is doped such that predominant charge carriers in the waveguide rib are complementary to predominant charge carriers in the doped semiconductor layer from which the waveguide rib protrudes,
wherein the waveguide rib forms a PN junction with a surface boundary of the doped semiconductor layer by contacting said doped semiconductor layer at said surface boundary not in contact with the one of a semiconductor and a semiconductor-on-insulator substrate, said surface boundary being parallel to a surface boundary of the doped semiconductor layer in contact with the one of a semiconductor and a semiconductor-on-insulator substrate, and
wherein the electrical contact on top of the waveguide rib directly contacts the waveguide rib.

11. The phase modulation waveguide structure according to claim 10, wherein the electrical contact on top of the waveguide rib is extended in a lateral direction thereof away from the position of the waveguide rib, and the metal electrode contact is on top of the lateral extension of the electrical contact.

12. The phase modulation waveguide structure according to claim 10, wherein the phase modulation waveguide structure further comprises another metal electrode contact on a highly doped region of the doped semiconductor layer, said metal electrode contact being of an opposite polarity of the metal electrode contact on top of the electrical contact.

13. The phase modulation waveguide structure according to claim 10, wherein the doped semiconductor layer is first doped by ion implantation, followed by epitaxially growing the waveguide rib with opposite doping on top of the doped semiconductor layer.

14. The phase modulation waveguide structure according to claim 1, wherein the phase modulation waveguide structure is built into at least one of: a Mach-Zender Interferometer (MZI) and a ring resonator.

15. A quantum well device for intensity modulation comprising:
a first doped semiconductor alloy layer grown on a semiconductor substrate;
a quantum well structure comprising an undoped semiconductor alloy quantum well layer sandwiched between a second doped semiconductor alloy layer of a same material and a doping as the first doped semiconductor alloy layer and a third doped semiconductor alloy layer of the same material and opposite doping as the first doped semiconductor alloy layer, the second doped semiconductor alloy layer contacting the first doped semiconductor alloy layer and being on top of the first doped semiconductor alloy layer; and
an electrical contact on top of the quantum well structure, said electrical contact being formed of a material with an optical refractive index close to that of a surrounding oxide layer that surrounds the quantum well structure and the electrical contact and lower than the optical refractive index of the doped semiconductor alloy layers,
wherein when a voltage is applied across the second doped semiconductor alloy layer and the third doped semiconductor alloy layer, an electric field and an optical absorption inside the undoped semiconductor alloy quantum well layer are changed, thereby modulating field intensity passing through said undoped semiconductor alloy quantum well layer.

16. The quantum well device according to claim 14, wherein a constituent semiconductor alloy material for all semiconductor alloy layers, including the semiconductor alloy quantum well layer, is SiGe.

17. The quantum well device according to claim 14, wherein a first electrodic contact is made on top of the electrical contact and a second electrodic contact is made on top of the first doped semiconductor alloy layer.

18. The quantum well device according to claim 16, wherein the electrical contact on top of the quantum well structure is extended in a lateral direction thereof away from the position of the quantum well structure, and the first electrodic contact is made on top of the lateral extension of the electrical contact.

19. The quantum well device according to claim 14, wherein the electrical contact comprises at least one selected from the group of: an Indium Tin Oxide (ITO) material, a CNT material, and metamaterials including arrays of CNTs.

20. The quantum well device according to claim 14, wherein the quantum well structure and the first doped semiconductor alloy layer are epitaxially grown on the semiconductor substrate.

21. A method of improving electrical connectivity and minimizing optical loss in a photonic waveguide structure, the method comprising:
providing an electrical contact on top of a semiconductor photonic waveguide, said electrical contact being formed of a material with an optical refractive index close to that of a surrounding oxide layer that surrounds the semiconductor waveguide and the electrical contact and lower than the optical refractive index of constituent semiconductor layers,
wherein the electrical contact minimizes optical loss by isolating a propagating optical mode between a core of the semiconductor waveguide and a metal electrode contacting said electrical contact.

22. The method according to claim 21, wherein the method comprises providing an electrical contact comprising at least one selected from the group of: an Indium Tin Oxide (ITO) material, a CNT material, and metamaterials including arrays of CNTs.

23. A communication link between processor cores comprising:
- a high-speed modulator comprising:
  - a phase modulation waveguide structure comprising:
    - one of a semiconductor and a semiconductor-on-insulator substrate;
    - a doped semiconductor layer formed over the one of a semiconductor and a semiconductor-on-insulator substrate, said doped semiconductor layer comprising a waveguide rib protruding from a surface thereof not in contact with the one of a semiconductor and a semiconductor-on-insulator substrate; and
    - an electrical contact on top of the waveguide rib, said electrical contact being formed of a material with an optical refractive index close to that of a surrounding oxide layer that surrounds the waveguide rib and the electrical contact and lower than the optical refractive index of the doped semiconductor layer,
    - wherein during propagation of an optical mode within the waveguide structure, the electrical contact isolates the optical mode between the doped semiconductor layer and a metal electrode contact on top of said electrical contact.

24. The communication link according to claim 23, wherein the electrical contact comprises at least one selected from the group of: an Indium Tin Oxide (ITO) material, a CNT material, and metamaterials including arrays of CNTs.

25. A communication link between processor cores comprising:
- a high-speed modulator comprising:
  - a quantum well device comprising:
    - a first doped semiconductor alloy layer grown on a semiconductor substrate;
    - a quantum well structure comprising an undoped semiconductor alloy quantum well layer sandwiched between a second doped semiconductor alloy layer of a same material and a doping as the first doped semiconductor alloy layer and a third doped semiconductor alloy layer of the same material and opposite doping as the first doped semiconductor alloy layer, the second doped semiconductor alloy layer contacting the first doped semiconductor alloy layer and being on top of the first doped semiconductor alloy layer; and
    - an electrical contact on top of the quantum well structure, said electrical contact being formed of a material with an optical refractive index close to that of a surrounding oxide layer that surrounds the quantum well structure and the electrical contact and lower than the optical refractive index of the doped semiconductor alloy layers,
    - wherein when a voltage is applied across the second doped semiconductor alloy layer and the third doped semiconductor alloy layer, an electric field and an optical absorption inside the undoped semiconductor alloy quantum well layer are changed, thereby modulating field intensity passing through said undoped semiconductor alloy quantum well layer.

26. The communication link according to claim 25, wherein the electrical contact comprises at least one selected from the group of: an Indium Tin Oxide (ITO) material, a CNT material, and metamaterials including arrays of CNTs.

* * * * *